Jan. 14, 1969 W. C. SCHMIDT 3,421,599
MOBILE SCAFFOLDING DEVICE PARTICULARLY FOR FRUIT PICKING
Filed Nov. 15, 1966 Sheet 3 of 3
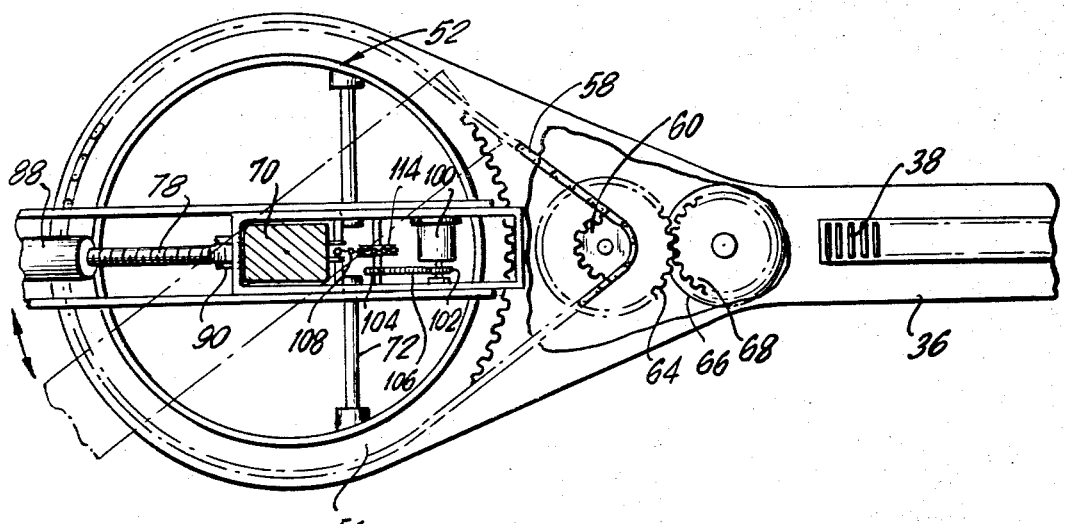
FIG. 4
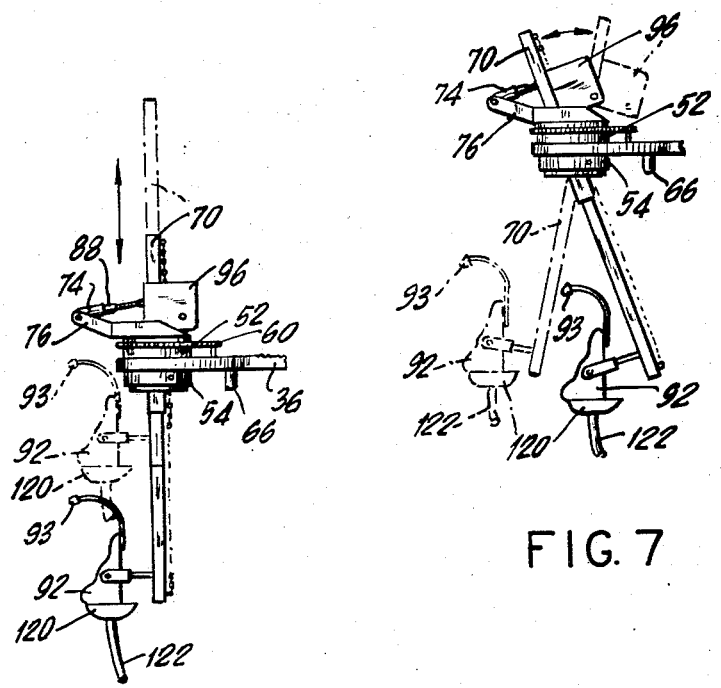
FIG. 6
FIG. 7
INVENTOR.
WILLIAM C. SCHMIDT
BY
*McGrew & Toren*
ATTORNEYS

United States Patent Office 3,421,599
Patented Jan. 14, 1969

3,421,599
MOBILE SCAFFOLDING DEVICE PARTICULARLY FOR FRUIT PICKING
William C. Schmidt, Lake Hiawatha, N.J.
(76 W. Muriel St., Orlando, Fla. 32806)
Filed Nov. 15, 1966, Ser. No. 594,517
U.S. Cl. 182—141                           14 Claims
Int. Cl. E04g 1/18

This invention relates, in general, to mobile scaffolding devices or mobile platforms and, in particular, to a new and useful device for supporting a person particularly in respect to a fruit tree for the purpose of picking the fruit therefrom and which includes a supporting chair or platform which may be revolved completely around the tree from a support positioned directly above the top of the tree, and to a new and useful fruit picking rig and to a method of picking fruit from fruit groves.

At the present time there are many types of rigs for supporting a person on a seat, platform or in a car which may be manipulated on a boom in order to position the platform at a desired elevation and orientation. The basic disadvantage with all of these devices is that the platform can only be manipulated through an arc in respect to one side of an object such as a tree from which fruit is to be picked. Up to the present time it was not possible to use such devices in a manner which would permit movement of the operator completely around the tree to pick all of the fruit therefrom while the support for the boom was stationary.

The present invention is particularly applicable for the picking of oranges in which trees are generally located substantially thirty feet on centers and have heights which extend anywhere up to 30 feet or more. It is usual for orange trees to grow so that there is approximately 18 inches between the outer branches of adjoining trees so that a vehicle can move along an aisle between rows of trees for the purpose of supporting a picker so that it can easily be moved to facilitate the picking of the fruit from the trees on each side of the aisle. The booms and supporting devices for the pickers which are known will permit manipulation in a manner so that the picker can be moved around one side of the trees of adjoining aisles. With such an apparatus and using such a method, the truck must be moved down through each of the aisles of the trees and only the sides of the trees which face the aisle in which the vehicle is located will be accessible for picking.

In accordance with the present invention, there is provided a vehicle for supporting an improved movable platform or seat device constructed in accordance with the invention. The device which is particularly useful for fruit picking includes a boom having a telescopic or extensible portion which carries at its upper end a supporting beam which may be moved outwardly or inwardly in respect to the boom. At the outer end of the supporting beam there is provided a turret-like mounting for a positioning beam or boom which may be pivoted so that it may be disposed at any desired angle in respect to the supporting beam and also rotated either when it is in a vertical position or in an inclined position in which latter case the portions thereof extending outwardly from the pivot will be rotated through a conical plane. The construction is such that the boom which is supported on a truck may be oriented at any desired angle and the supporting beam may be extended in order to position the center of the turret support for the positioning beam directly over the top of a tree which is to be picked. In this manner, the positioning beam which may be raised and lowered in the turret-mounting as well as pivoted and rotated may be angled downwardly along a side of a tree and then moved completely around the tree and up and down the tree to effect picking of all of the fruit of the tree in a single operation.

In accordance with a preferred method of the invention, trees, such as orange trees, are picked by advancing a vehicle containing the picker or operator supports between rows of trees and suspending the picker on a support positioning boom which is pivoted at a location directly above the top of the tree so that he may be moved upwardly and downwardly along a side of the tree as well as completely around the tree to obtain all of the fruit from each tree on each side of the aisle, thereafter skipping the next row between trees and driving the vehicle into the row after the next row to effect picking of the fruit from the trees on each side of the row after the next and so on to completely pick the fruit off the trees in each row of the grove.

In accordance with a further feature of the invention, the booms for supporting the positioning boom for a picker's chair are carried on each end of a vehicle which may be of simple frame-like construction and which is advantageously self-propelled and includes four wheels. A separate supporting boom is arranged at each end of the vehicle and the booms are advantageously arranged to extend outwardly to permit picking of the tree of the row on one side of the vehicle at the front end and picking of the tree arranged at the other side of the vehicle from the rear end. The picking chair for the operator is advantageously suspended at the lower end of the positioning boom and the operator is provided with suitable controls for raising or lowering the positioning boom or for tilting it at any desired angle so that he may proceed upwardly and downwardly to pick the fruit from the tree. In addition, he may rotate the positioning boom about an axis positioned over the top of the tree so that he can move completely around the tree. The fruit which he picks is directed through a flexible chute for delivery downwardly onto a container arranged on the truck.

Accordingly, it is an object of the invention to provide an improved device for supporting a person or similar object which includes a boom having a supporting arm which may be moved outwardly from the upper end of the boom and which pivotally supports a positioning beam or boom which carries a support at its lower end for an operator, and wherein the positioning boom may be pivoted to any desired angle and rotated in either a pivoted or a non-pivoted condition and which may be raised or lowered as desired for locating the operator's supporting chair at any desired elevation.

A further object of the invention is to provide a device for picking fruit and the like which includes means for suspending an operator so that he can be moved completely around a tree as well as up and down in respect to the tree for the picking of the fruit therefrom.

A further object of the invention is to provide a device which permits picking of all of the fruit from trees arranged in two adjacent rows which includes a vehicle which is adapted to run between the adjacent rows and which includes at least one positioning boom thereon which may be raised or lowered and which carries at its upper end a supporting beam which pivotally and rotatably supports a positioning beam carrying an operator's chair at its lower end. The positioning beam may be raised or lowered so that it may extend downwardly by a predetermined amount from the supporting beam and in addition it may be rotated about its longitudinal axis or about a vertical axis passing through its longitudinal axis.

A further object of the invention is to provide a method for picking fruit in a grove or orchard which comprises moving a vehicle between two adjacent rows of fruit trees and picking the fruit off each tree completely around the tree of the rows on each side of the aisle while the vehicle is positioned between the rows and thereafter skipping a row of trees and moving to the next aisle between tree rows to pick the fruit from the two rows of trees adjacent the aisle.

A further object of the invention is to provide a picking device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 4 is an enlarged, partial sectional view taken along the line 4—4 of FIG. 3;

FIG. 5 is a partial section taken along the line 5—5 of FIG. 3;

FIG. 6 is a partial side elevational view indicating the manner in which the picking chair positioning boom may be raised and lowered vertically; and FIG. 7 is a view similar to FIG. 6 indicating the manner in which the positioning boom with the picker chair may be adjusted angularly in respect to the vertical.

Figure 1:
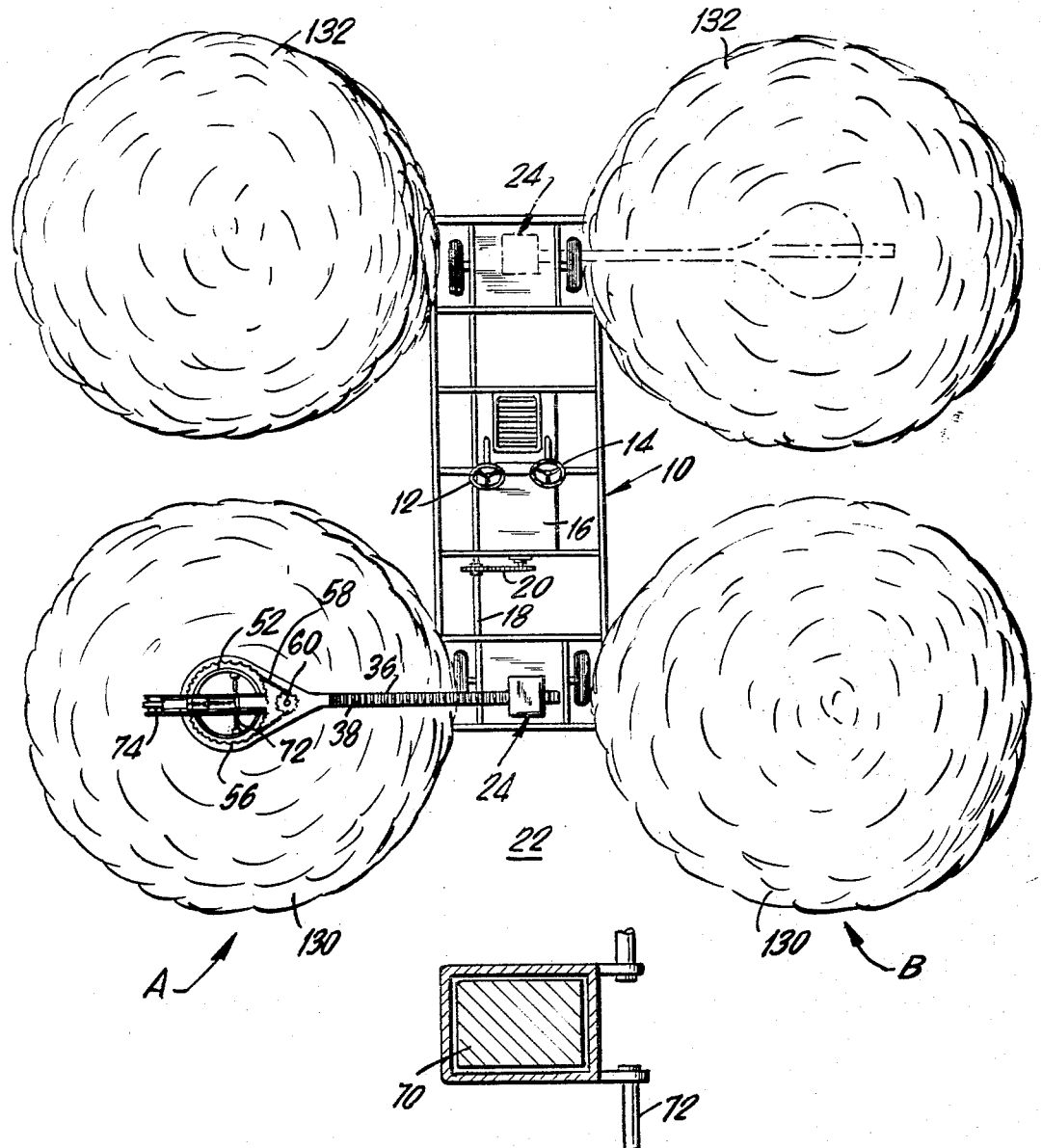
FIG. 1 is a top plan view of an orange grove with mobile picking rig constructed in accordance with the invention arranged in an aisle between tree rows.

Referring to the drawings in particular, the invention embodied therein comprises a four-wheeled vehicle generally designated 10 which may be driven either forwardly or in reverse by using either one of two wheel controls 12 and 14. A motor 16 is arranged to drive a drive shaft 18 through a gear and chain set 20 in order to drive the vehicle into an aisle 22 arranged between row A and row B of a fruit orchard, for example an orange grove.

In the preferred form, the vehicle 10 carries a mobile fruit picker supporting rig or mobile platform generally designated 24 at each end. The mobile fruit picker supporting rig 24 in the embodiment illustrated includes a mounting base portion 26 having suitable controls (not shown) for raising and lowering a telescopic boom portion 28 in respect to a main supporting boom portion 30. The boom portions 28 and 30 may be of any well known type and the mechanism for raising and lowering the telescopic portion 28 may, for example, be either a gear driven, wire cable driven or hydraulically driven mechanism.

In accordance with one feature of the invention, the telescopic boom 28 carries at its upper end a housing 32 which is pivotally connected at 34 to the telescopic boom member 28. The housing 32 is provided with guideways which permit the movement of a supporting beam 36 in respect thereto along channel trackways defined within the housing 32. The supporting beam 36 is provided with a rack portion 38 on its upper surface which is engaged by a driving gear 40. The relative position of the supporting beam 36, that is, the amount at which it extends inwardly or outwardly from the upper telescopic boom member 28 may be controlled by means of a motor 42 which drives the driving gear 40 through a chain 44 and sprocket 46 and a gear 48 affixed to the same shaft as the sprocket 46. Suitable electrical means are provided which extend downwardly to the base 26 and also to the picker's operating location for operating the motor 42 for controlling the position of the supporting beam 36. The supporting beam 36 may be controlled not only in respect to the amount at which it extends outwardly from the telescopic boom member 28 but also the amount of inclination of this beam. This may be regulated such as by a turnbuckle arrangement generally designated 50 which is pivotally connected between the housing 32 and the telescopic beam member 28 or by means of a motor driven control for adjusting this inclination (not shown).

At the outer end of the supporting beam 36, there is provided a mounting turret or drum generally designated 52 which is rotatably supported in an outer drum frame 54 carried at the outer end of the supporting beam 36. The drum 52 is provided with an external gear 56 thereon which is driven from a chain 58 which, in turn, is driven from a sprocket gear 60. The sprocket gear 60 is carried on a shaft 62 which is rotatably mounted in the supporting beam 36 and carries a gear 64 thereon which is driven from a motor 66 driving through a drive gear 68. A control for the motor 66 is advantageously located at the support 26 and at an operator's platform or seat.

Figure 3:
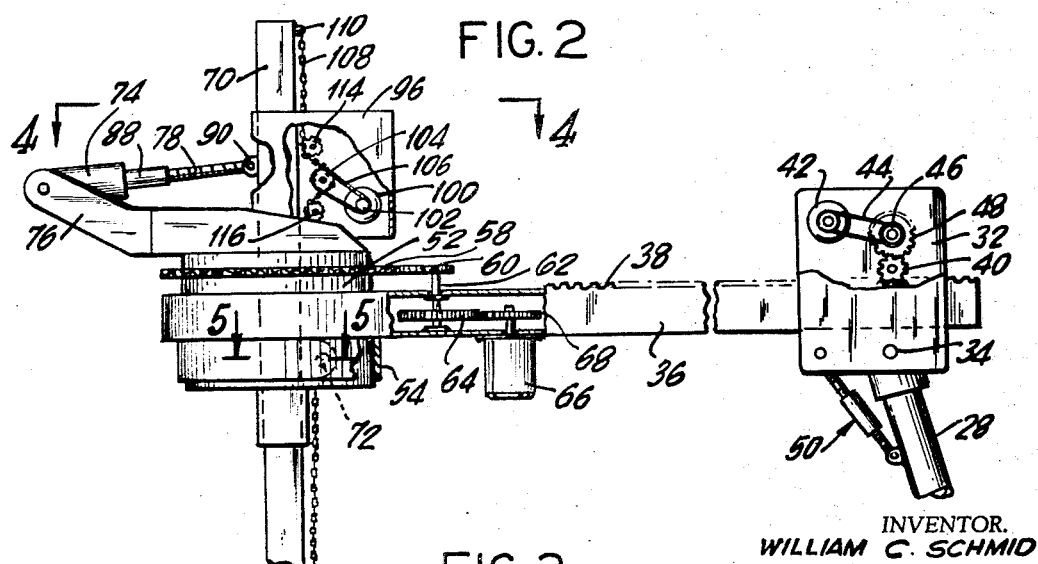
FIG. 3 is an enlarged elevational view, partly in section, of the supporting beam carried at the upper end of the boom with the picker positioning beam located in a vertical orientation.

In accordance with a further feature of the invention, a picker's chair supporting beam or positioning beam 70 is pivotally mounted on a pivot member or pivot pin 72 which is carried by the inner drum 52. Therefore, the positioning beam 70 is rotatable along with the drum 52 about a substantially vertical axis when the supporting beam 36 is in a horizontal position as indicated in FIG. 3. This rotational axis of the beam 70 which may be changed by changing the angle of the supporting beam 36 and also by pivoting the positioning beam 70 about its pivotal mounting 72. This is effected by a driving motor 74 which is pivotally mounted on a supporting arm portion 76 formed as an extension of the upper end of the inner drum 52. The driving motor is effective to rotate a worm 78 to shift the position of the worm in respect to a nut member 80 which is affixed to the support 76 so as to vary the spacing between a pivot 90 for the other end of the worm 78 in respect to the arm 76 and hence the inclination of the positioning beam 70 in respect to its supporting drum 52.

Figure 2:
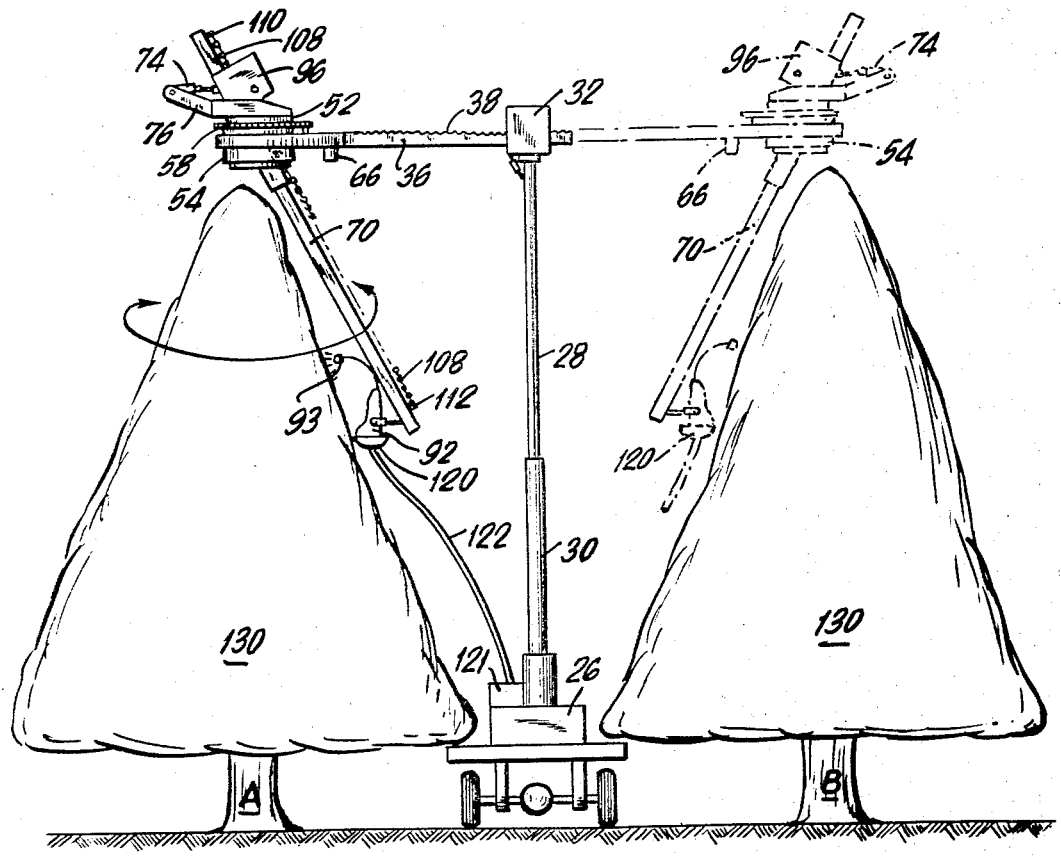
FIG. 2 is an elevational view of the tree rows indicated in FIG. 1 indicating the manner in which the operator's supporting rig may be manipulated to position a picker so that he may easily pick fruit completely around the tree on each of the rows on each side of the aisle.

A chair or picker's platform 92 for supporting a fruit picker or operator is suspended on a fixed frame 94 from the lower end of a positioning beam 70 (see FIGS. 2, 6 and 7). At the location of the chair 92 there is provided a light 93 for illuminating the tree at night and a control panel (not shown) which connects to the motor 74 and the motor 66 for regulating the inclination and the rotative position of the positioning beam 70 and hence of the chair 92. In addition, suitable controls are also provided for regulating the inclination and extension of the supporting means 36 and the elevation and inclination of the boom members 28 and 30. In addition to its rotative movement, the beam 70 may be moved upwardly and downwardly in respect to its associated drum support 52 and positioning beam 36. In order to permit such movement, the drum carries a turret member 96 (FIG. 3) which forms a guideway for the beam 70 and which carries a control motor 100 for regulating the extension or retraction of the positioning beam 70. The motor 100 drives a gear 102 which drives a gear 104 through a chain belt 106. The sprocket wheel 104 engages a chain 108 which is secured at each end to the positioning beam at the locations designated 110 at the upper end and 112 at the lower end. Tension sprockets 114 and 116 are arranged to engage the upper and lower portions of the chain 108 on each side of the driving sprocket 104 in order to make certain of the driving engagement of the chain for changing the position of the positioning beam 70 in respect to the supporting beam 36 as desired.

A further feature of the invention is that the operator's chair is provided with a side attachment in which is located a fruit collecting funnel 120 into which the fruit which is picked is directed. A flexible connecting duct 122 extends downwardly from the funnel 120 to a container 121 on the vehicle 10 which includes a container for storing the picked fruit which is deilvered through the conduit or chute 122 (see FIG. 2).

The invention provides a device for positioning a picker at any desired location in association with a fruit tree of any type but it is particularly applicable for the picking of oranges in orange groves. The vehicle 10 is designed so that the body height is such that the body will normally pass below the lowermost branches of the trees between the rows designated A and B (FIGS. 1 and 2). With the inventive method, it is only necessary to move the collecting vehicle or picking rig into alternate aisles of the grove or orchard since the trees on each side of the aisle may be completely picked around all sides thereof.

In accordance with the preferred method, the vehicle is oriented centrally between four adjacent trees, two trees of each adjacent row. One of the positioning devices 24 is advantageously moved so that a boom thereof is either oriented substantially vertically (FIG. 2) or so that it would tilt toward a tree designated 130 in row A and the positioned device 24 at the forward end of the vehicle is arranged so that it would be oriented over a tree designateld 132 in row B. After the trees 130 and 132 are picked in the associated rows, then the positioning devices 24 are switched so that the forward end will be oriented over the tree 132 in row A and the trailing end positioning device will be located over the tree 130 in row B.

A feature of the picking method is that the supporting boom or positioning boom 70 which carries the picking operator or the picking supporting chair 92 is oriented so that the axis of the inner drum 52 which pivotally supports the positioning beam 70 is located substantially in alignment with the axis of the tree. Once this is done, then the picker's chair 92 may be positioned at any desired elevation or angular position in respect to the complete circumference of the affected tree. For example, as indicated in FIG. 2, the chair 92 may be initially positioned adjacent the top of the tree and the picker will proceed to pick completely around the tree adjacent the top thereof. Thereafter, the positioning beam 70 may be lowered in respect to the supporting beam 36 so that the process may be repeated around an area of the tree below the top. The beam 70 may then be extended so that the lowermost portions of the tree can be picked around its complete periphery. On the other hand, the device may be used to first permit the picker to pick from the top to the bottom on one side of the tree by moving the positioning beam 70 upwardly and downwardly to change the elevation of the picker's chair 92 and thereafter rotating the drum 52 with the positioning beam 70 inclined in order to shift the position of the chair 92 around the tree.

While a specific embodiment of the invention has been shown and described in detail to illustrate the application of the inventive principles, it will be understood that the invention may be embodied otherwise without departing from such principles.

What is claimed is:

1. A movable platform device comprising a supporting beam, means for supporting said supporting beam at a selected elevation, a positioning beam carrying a supporting platform, and means supporting said positioning beam on said supporting beam for pivotal angular movement and for rotation, said means supporting said positioning beam on said supporting beam including a drum mounted on said positioning beam for rotation, said positioning beam being pivotally mounted on said drum.

2. A movable platform device according to claim 1, including means on said drum connected to said positioning beam for pivoting said positioning beam.

3. A movable platform device comprising a supporting beam, means for supporting said supporting beam at a selected elevation, a positioning beam carrying a supporting platform, and means supporting said positioning beam on said supporting beam for pivotal angular movement and for rotation, said means for supporting said positioning beam on said supporting beam including a drum rotatably mounted on said positioning beam for rotation about an axis substantially perpendicular to the longitudinal axis of said positioning beam, a pivot pin extending across the interior of said drum, said positioning beam being pivotally mounted on said pivot pin, and means for rotating said drum.

4. A movable platform device according to claim 3, including means mounted on said drum connected to the upper end of said positioning arm and being movable to pivot said positioning arm about said pivot pin, and means connected to said positioning beam for extending and retracting said positioning beam in respect to said supporting arm.

5. A movable platform device comprising a supporting beam, means for supporting said supporting beam at a selected elevation, a positioning beam carrying a supporting platform, means supporting said positioning beam on said supporting beam for pivotal angular movement and for rotation, means connected to said positioning beam to rotate said positioning beam, pivot means connected to said positioning beam to pivot said positioning beam, and means connected to said positioning beam for extending said positioning beam outwardly and retracting it inwardly in respect to said supporting beam.

6. A movable platform device according to claim 5, wherein said means for supporting said supporting beam includes a boom having a telescoping portion connected to one end of said supporting beam.

7. A movable platform device particularly for picking fruit from trees comprising a mounting base, a boom on said mounting base having a portion which may be raised and lowered, a supporting beam carried at the upper end of said boom and extending outwardly therefrom, a rotatable drum rotatably mounted on said supporting beam, a positioning beam pivotally mounted on said drum and being rotatable with said drum, means connected to said drum for rotating said drum, means connected between said supporting arm and said positioning beam for pivoting said positioning beam relative to said supporting arm, operator's support means carried on said positioning beam, and means connected to said positioning beam for shifting said positioning beam outwardly and inwardly in respect to said supporting beam.

8. A movable platform device according to claim 7, wherein the connection between said supporting beam and said boom includes means for changing the angle between said supporting means and said boom.

9. A movable platform device according to claim 7, wherein said supporting means on said positioning beam include a chair for a fruit picker, and means adjacent said chair for conveying fruit which is picked downwardly to said mounting platform.

10. A movable platform device according to claim 7, including a beam rotating motor carried on said supporting arm and gear means connected between said rotating motor and said drum for rotating said positioning beam with said drum.

11. A movable platform device according to claim 10, wherein said means for pivoting said positioning beam includes a driving motor mounted on said drum, and a wormscrew rotatable by said motor and connected to said positioning beam and being displaceable upon rotation to pivot said positioning beam.

12. A movable platform device according to claim 7, including means connected to said supporting beam adjacent said boom for shifting said supporting beam inwardly and outwardly in respect to said boom.

13. A movable platform device according to claim 12, wherein said means for shifting said supporting beam includes a rack defined on the exterior of said supporting beam and gear means connected to said rack for shifting said rack with said supporting beam.

14. A method of picking crops from trees in a grove or orchard in which the trees are arranged in spaced rows using a vehicle rig with a platform or chair which may be suspended above the trees and rotated around the trees and moved upwardly and downwardly in respect to the trees comprising driving the vehicle between the aisle between first and second rows of the trees and moving the picker in the chair around the tree and upwardly and downwardly in respect to the tree to pick all of the fruit off the trees in the rows on each side of the aisle, thereatfer moving the vehicle to the third aisle between rows of trees skipping the second aisle in order to pick from the trees on each side of the third aisle and so on.

References Cited

UNITED STATES PATENTS

| 3,183,997 | 5/1965 | Kleiss | 182—150 |
| 3,203,503 | 8/1965 | Smith et al. | 182—2 |
| 3,272,282 | 9/1966 | Sanders | 182—141 |
| 3,311,192 | 3/1967 | Richey | 182—2 |

REINALDO P. MACHADO, *Primary Examiner.*

U.S. Cl. X.R.

182—131, 63